J. W. GAUL.
NUT LOCK.
APPLICATION FILED AUG. 30, 1911.

1,083,080.

Patented Dec. 30, 1913.

Witnesses

Inventor
James W. Gaul
By Victor J. Evans
Attorney

UNITED STATES PATENT OFFICE.

JAMES W. GAUL, OF FORT LAUDERDALE, FLORIDA.

NUT-LOCK.

1,083,080.  Specification of Letters Patent.  Patented Dec. 30, 1913.

Application filed August 30, 1911. Serial No. 646,819.

*To all whom it may concern:*

Be it known that I, JAMES W. GAUL, a citizen of the United States, residing at Fort Lauderdale, in the county of Dade and State of Florida, have invented new and useful Improvements in Nut-Locks, of which the following is a specification.

This invention relates to certain novel improvements in nut locks.

The object of the invention is to provide a simple, cheap and thoroughly effective device whereby a nut will be sustained in a locked position upon a bolt.

With the above recited object in view, the invention resides in the novel construction and arrangement of parts which will be hereinafter more fully set forth and claimed.

Figure 1:
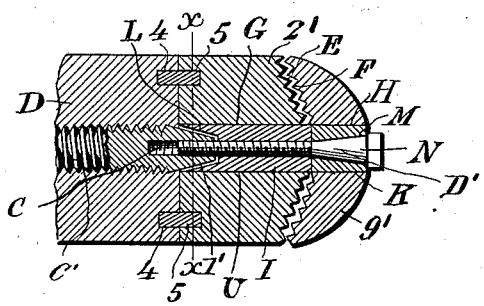
Figure 2:
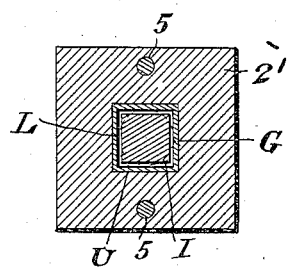

In the drawings,—Figure 1 is a central longitudinal sectional view illustrating my improved nut lock in operative position, Fig. 2 is a sectional view on the line $x$—$x$ of Fig. 1.

In the drawing, C′ designates a bolt which is provided with a substantially frusto-pyramidal extension 1′. The bolt and its extension is provided with a threaded bore or opening C.

D designates the nut for the bolt. This nut is of the ordinary construction, but has its outer face provided with depressions 4 for the reception of pins 5.

2′ designates the lock-nut. This nut is provided with a square or non-circular bore G as well as having its face which is arranged adjacent the outer face of the nut D provided with depressions for the reception of the extending portions of the pins 5. The outer face of the nut 2′ is provided with teeth E, while arranged within the squared bore of the said nut is a follower member I, the same having what may be termed a frusto-pyramidal bore L which is adapted to engage with the frusto-pyramidal extension 1′ of the bolt C′. The follower member I is also provided with a reduced opening U which communicates with its bore.

F designates a cap which has its inner face toothed to engage with the teeth E of the lock nut 2′. This cap F is provided with a squared bore in which is a member K, and the said member K is provided with a conical shaped opening for the reception of the end D′ of a headed member M. This member M is provided with a threaded stem N which passes through the opening in the follower member and which engages the threaded opening C in the bolt C′. By such an arrangement it will be noted that when the member 9′ is screwed home the cap F will have its teeth firmly engaged with the teeth E of the lock nut, and as the follower I engages with the non-circular extension of the bolt C′, and also as well as the pins 5 being received within the depressions in the nuts D and 2′ respectively, the accidental removal of the nut from the bolt is effectively prevented.

Having thus described the invention, what I claim is:

1. In a nut lock, a bolt having an angular extension, a follower member having an angular bore engaging the extension, a lock nut having an angular bore within which is received the follower, pin members connecting the nut with the lock nut, a cap for the lock nut, and means for forcing the cap into frictional engagement with the lock nut for securing the lock nut to the angular extension of the bolt.

2. In a lock nut, a bolt having a frusto-pyramidal projection provided with a threaded bore, a nut for the bolt, pins for the nut, a lock nut having depressions for the reception of the pins, said lock nut having a square bore, a follower arranged within the bore and engaging the walls thereof, said follower having a frusto-pyramidal bore which is adapted to co-act with the frusto-pyramidal extension of the bolt, the outer face of the lock nut being provided with teeth, a cap having its inner face provided with teeth and co-acting with the teeth of the lock nut, and a headed threaded member arranged for rotation upon the cap and passing through the follower and engaging the threads of the bore of the bolt.

In testimony whereof I affix my signature in presence of two witnesses.

JAMES W. GAUL.

Witnesses:
- JOHN MALAKA,
- JNO. F. BLAKY.

Copies of this patent may be obtained for five cents each, by addressing the "Commissioner of Patents, Washington, D. C."